United States Patent Office 2,912,887
Patented Nov. 17, 1959

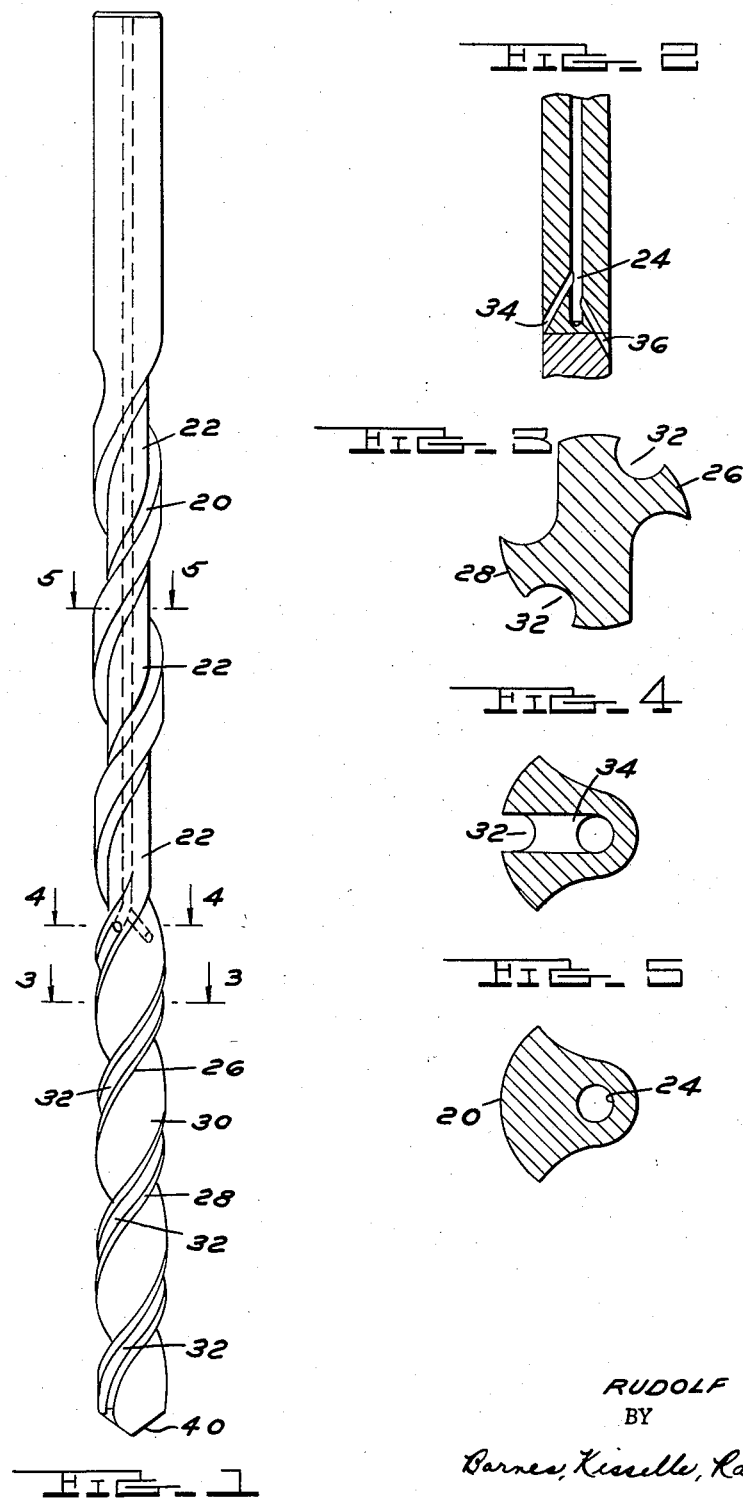

2,912,887

SINGLE-DOUBLE SPIRAL DRILL

Rudolf W. Andreasson, Birmingham, Mich.

Application March 17, 1958, Serial No. 722,014

1 Claim. (Cl. 77—68)

This invention relates to a drill construction and has particularly to do with a combination drill point and drill shank.

It is an object of the invention to provide a drill for deep-hole operations which will remain adequately cool at the operating end and yet which is so designed that the coolant can carry away the chips from the cutting operation.

Gun drills have commonly been made in recent years with a straight shank and a straight segmental groove which has served to form an exit passage for the chips. This has had some disadvantages in that a high torque on the tool will cause an uneven twist and a bending of the tool which is apt to cause scoring. Also, there is no feeding action for the chips and they must force themselves out of the straight groove while it is turning.

It is an object of the present invention to combine the advantages of this large groove in a gun drill while also utilizing the features of a spiral drill flute and a coolant flow arrangement which efficiently cools the operating end of the tool.

Other objects and features of the invention will be apparent in the following description and claim.

Drawings accompany the invention and the various views thereof may be briefly described as:

Figure 1, a side elevation of the completed tool.

Figure 2, a partial axial section at about line 4—4 of Figure 1.

Figures 3, 4 and 5, segmental views on lines 3—3, 4—4 and 5—5 of Figure 1.

Referring to the drawings, the main driving shank of the tool is formed with a single spiral land 20 which is widely spaced to provide a flute 22. The land is about one-half the width of the flute. This shank can be as long as desired for the particular holes to be formed, and the shank has a central hole 24 for coolant.

The tip end of the drill is formed with a double spiral land 26 and 28, these lands being separated by flutes 30. The lands are relieved centrally between their edges to provide grooves 32, each of which is connected to the central passage 24 by diverging cross bores 34 and 36 which angle outwardly and toward the tip (Fig. 2). The drill tip is suitably brazed or welded on to the shank in a manner which is known.

In operation, the coolant flows through the central passage 24 into the diverging passages 34 and 36 to the surface passages 32 in the double lands; and by reason of the surface tension, the coolant flows down the passages 32 directly to the cutting tip 40.

Thus an effective cooling is obtained and the chips are moved up the flutes 30 between the lands 26 and 28 to the single flute 22 which is of relatively large cross sectional area, thus permitting the chips to flow freely out of the hole.

It will be seen that I have provided a gun drill which has adequate chip passage but which also has a uniform resistance to torque, because of the spiral lands which prevents bending and provides a stronger drill than the straight flute type now commonly in use.

What I claim is:

A deep-hole drill comprising a shank and drive portion having a single, widely-spaced, spiral land extending its length, the flute of the shank between said spiral land being approximately twice the width of the land, said shank having an axial passage for coolant, said passage diverging from the center and axially to opposite openings on the surface at the lower end, and a drill tip joined to the end of said shank comprising a cylindrical portion having a double-spiral lands each having between its edges a relieved surface to provide a groove to the cutting end of the tip, said grooves being connected respectively to the opposite openings at the end of the shank.

References Cited in the file of this patent

UNITED STATES PATENTS

| | | |
|---|---|---|
| 2,325,973 | Nurnberger et al. | Aug. 3, 1943 |
| 2,348,874 | Andreasson | May 16, 1944 |